Dec. 25, 1923.
W. A. HAZLEWOOD
1,478,608
PISTON FOR INTERNAL COMBUSTION ENGINES
Filed March 27, 1923
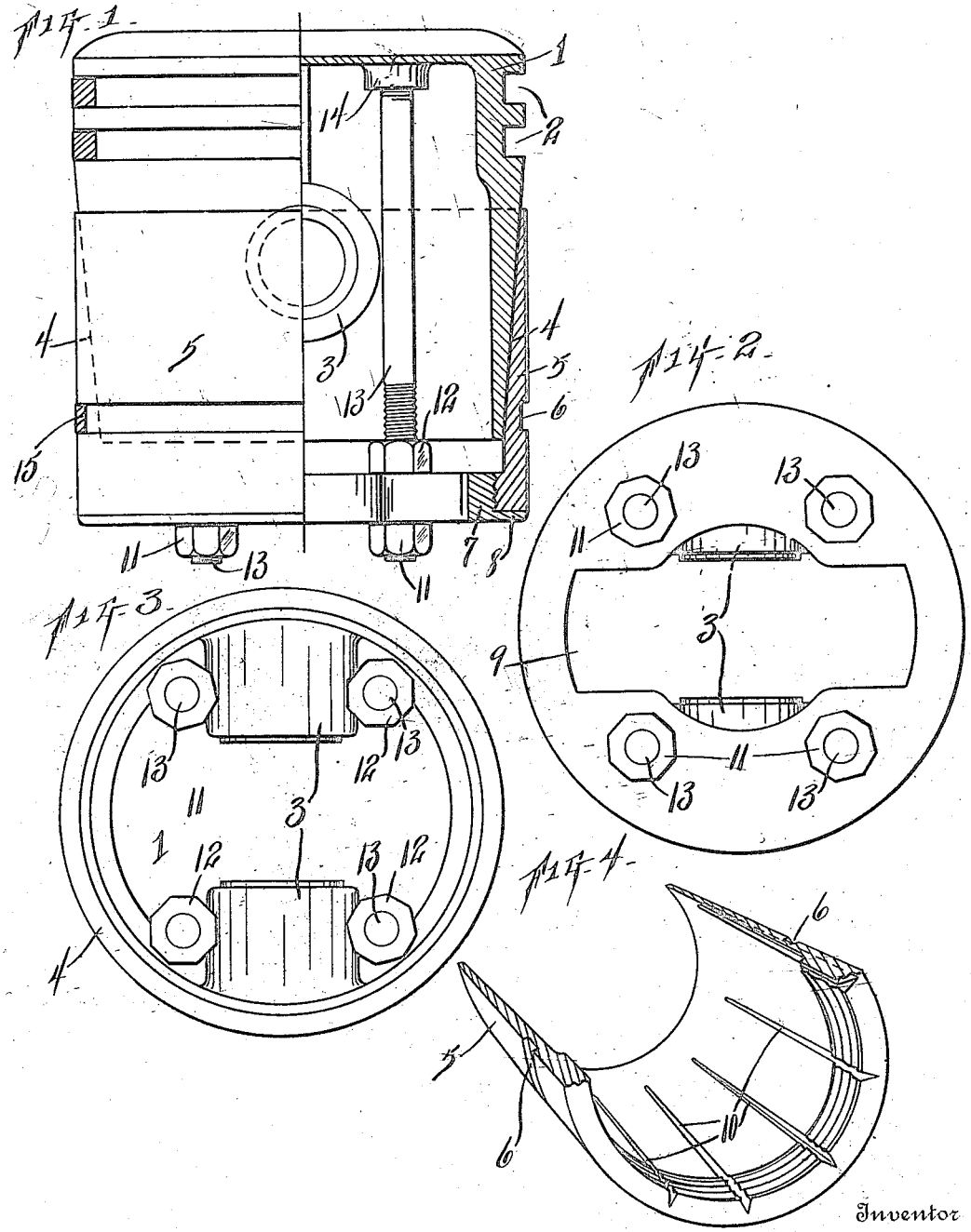
Inventor
William A. Hazlewood
By A. L. Jackson
Attorney Patented Dec. 25, 1923.

1,478,608

UNITED STATES PATENT OFFICE.

WILLIAM A. HAZLEWOOD, OF FORT WORTH, TEXAS, ASSIGNOR OF ONE-THIRD TO JESS H. WHITE, OF FORT WORTH, TEXAS.

PISTON FOR INTERNAL-COMBUSTION ENGINES.

Application filed March 27, 1923. Serial No. 627,983.

*To all whom it may concern:*

Be it known that I, WILLIAM A. HAZLEWOOD, a citizen of the United States, residing at Fort Worth, in the county of Tarrant and State of Texas, have invented certain new and useful Improvements in Pistons for Internal-Combustion Engines, of which the following is a specification.

My invention relates to pistons and more particularly to pistons for internal combustion engines; and the object is to provide a piston which is adjustable and expansible and durable and which will prevent slap in the cylinder and which is provided with a skirt which will prevent the connecting rod pin from scoring the cylinder and which will prevent the galling of the cylinder wall and which is adapted to carry an oil ring which will prevent the fouling of the spark plugs. Another object is to provide a piston which is easily and quickly and conveniently installed or taken down or adjusted. Other objects and advantages will be fully explained in the following description and the invention will be more particularly pointed out in the claims.

Reference is had to the accompanying drawings which form a part of this application.

Fig. 1 is an elevation of the piston, one half being in vertical section. Fig. 2 is a bottom plan view with the bottom cap in place. Fig. 3 is a bottom plan view with the bottom cap removed. Fig. 4 is a sectional perspective view, showing the kerfs or slits which permit expansion and contraction of the fibre skirt.

Similar characters of reference are used to indicate the same parts throughout the several views.

The piston 1 has the usual grooves 2 for piston rings or packing rings. Bearings 3 for a connecting pin (not shown) are shown on the opposite sides of the interior of the piston. The lower portion 4 of the piston is shown tapered conically and a fibre skirt 5, cylindrical on the outside and somewhat funnel-shaped or flared on the inside to conform in shape with the exterior of the piston body. One function of the fibre skirt is to shield the cylinder wall of the motor from the ends of the connecting pin and so prevent scoring of the cylinder wall by the connecting pin. The fibre skirt 5 is provided with an annular groove 6 for a packing ring for oil, the grooves 2 being for compression packing rings.

Means are provided for mounting and holding the skirt 5 in place. A fibre cap 7 is screwed into the outer end of the skirt 5 and is provided with a flange 8 which supports the skirt 5 on its outer end, the principal support for the skirt 5 being the threads which are engaged by the threads of the cap 7. Means are provided for supporting and adjusting the cap 7. Screw sockets 14 are formed in the head of the piston and rods 13 are screwed into the sockets. The outer ends of the rods 13 are threaded and lock-nuts 12 are screwed on the rods 13 above the cap 7 and nuts 11 are screwed on the rods 13 below the cap 7. The cap 7 is provided with an opening 9 for the connecting rod of the motor (not shown). The skirt 5 has slits or kerfs or grooves 10 on the inside to permit contraction and expansion of the skirt 5. The nuts 12 are first located on the rods 13 tentatively. The cap 7 is then screwed into the skirt 5. The cap 7 has openings for the rods 13. The cap 7 and the skirt 5, being locked together by the screw threads, are put in place, the skirt going on the outside of the piston 1 and the holes in the cap 7 engaging the rods 13. Nuts 11 are then screwed on the rods 13 to tighten the skirt 5 on the piston. If the skirt 5 becomes worn, the nuts 11 can be used to force the skirt 5 further up on the piston 1, the slits or kerfs or grooves 10 permitting the skirt 5 to expand and the skirt being of fibre will expand and contract more or less.

The location of the groove 6 for the oil ring 15 is for the purpose of preventing the piston from pumping oil. The oil will be scraped off of the cylinder wall and forced back into the crank case. The ring 15 will be generally dispensed with and the groove 6 used as a pocket for carrying oil to lubricate the cylinder.

What I claim is—

1. A piston comprising a body provided with annular grooves in the periphery thereof for piston rings, a tapered skirt integral with said body, a head integral with said body and provided with screw-threaded sockets, a fibre skirt having a cylindrical periphery and an annular oil ring groove therein and having the interior tapered to conform in contour with the skirt of said body portion, a fibre cap screwed into the end of said fibre skirt, stud bolts screwed into said sockets and projected through said cap, and nuts for said bolts for holding said cap and fibre skirt in place.

2. A piston comprising a body provided with annular grooves in the periphery thereof for piston rings, an integral skirt tapered on the outer periphery and provided with integral bearings for a connecting pin, a head provided with screw-threaded sockets, a fibre skirt having a cylindrical exterior periphery and a tapered interior periphery engaging the tapered form of said piston skirt and provided with an oil ring groove in its exterior periphery, a fibre cap screwed into said fibre skirt and provided with an opening therethrough for the movement of a crank connecting bar, and bolts screwed into said sockets and projected through said cap, and nuts and lock-nuts for adjusting and locking said cap and fibre skirt in rigid operative relation with said piston.

3. A piston having a head and a body provided with annular grooves in its periphery for piston rings and a skirt integral therewith and tapered on the exterior and provided with diametrically positioned openings and integral bearings for a connecting pin, a fibre skirt having a cylindrical exterior periphery and an annular oil ring groove therein and tapered on the interior to conform in contour with the tapered skirt of said piston and closing the openings in said piston skirt, a fibre cap screwed into said fibre skirt and provided with bolt holes and an opening for the movement of a crank connecting bar and having a radial flange engaging the end of said fibre skirt, bolts rigid with said head and projected through said bolt holes, and nuts and lock nuts for adjusting and locking said fibre skirt and cap in rigid operative relation to said piston.

In testimony whereof I set my hand this 24th day of February, 1923.

WILLIAM A. HAZLEWOOD.